Jan. 4, 1927.
W. MARSHALL
WEATHER STRIP
Filed Feb. 9, 1925
1,613,044
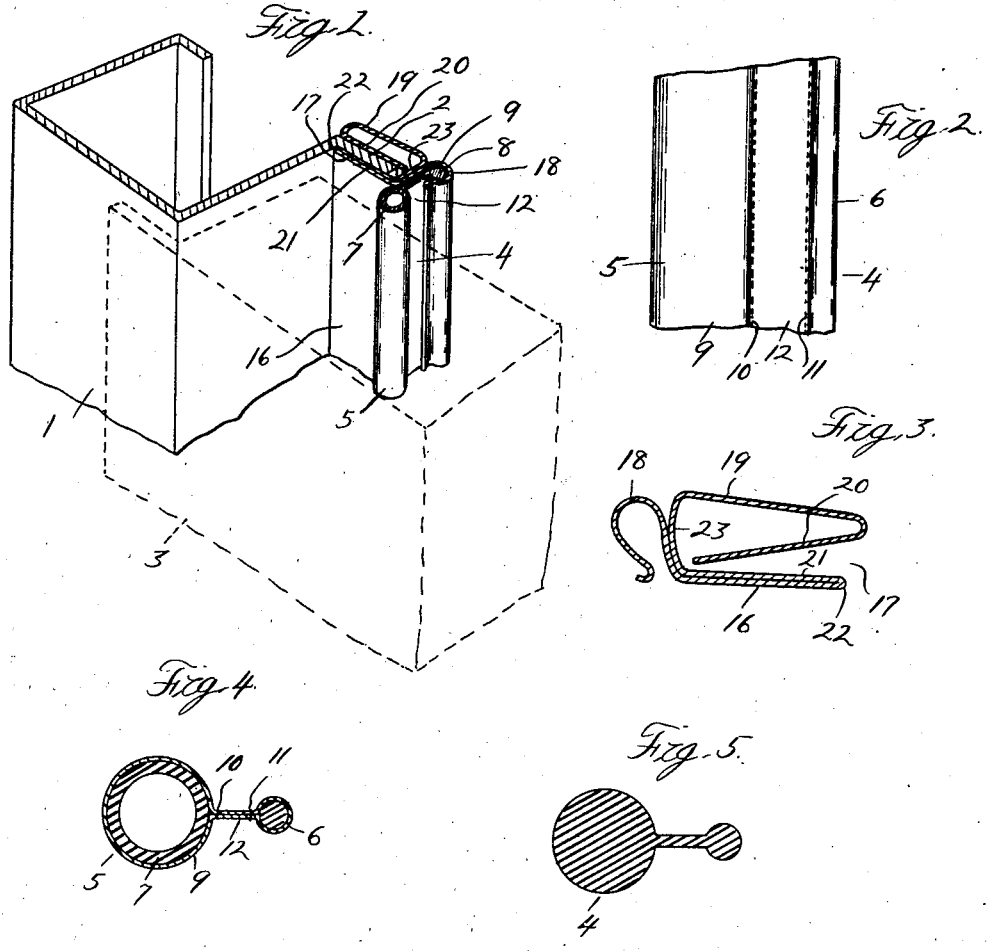
Inventor
William Marshall
By Whittemore Hulbert Whittemore
 + Belknap    Attorneys Patented Jan. 4, 1927.

1,613,044

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

WEATHER STRIP.

Application filed February 9, 1925. Serial No. 8,018.

This invention relates generally to weather strips designed particularly for sealing the joints between the jambs and swinging doors of vehicle bodies, and consists of certain novel features of construction, combinations and arrangements of parts as will be more fully described and particularly pointed out in the appended claims.

In the accompanying drawing;

Figure 1 is a fragmentary perspective view of a weather strip embodying my invention applied to a door jamb.

Figure 2 is a fragmentary elevation of the weather strip.

Figure 3 is a sectional view through the molding.

Figure 4 is a cross sectional view through the weather strip.

Figure 5 is a sectional view through a slightly modified form of construction.

Referring now to the drawing in which like characters of reference designate corresponding parts throughout the several views, the numeral 1 designates a jamb, preferably of a vehicle body, having a laterally extending flange 2 at its inner edge that serves as an abutment for a suitable swinging door 3. For sealing the joints between the inner face of the door and the outer face of the flange 2, I preferably provide a suitable weather strip 4 which preferably comprises a sealing member 5 and a longitudinally extending bead 6. As shown, the sealing member 5 is preferably provided with a resilient body 7 that is preferably tubular in form, while the bead 6 is preferably provided with a flexible body 8 that is preferably formed of cord. Any suitable means such as the fabric covering 9 may be used to conceal the resilient body 7 and cord 8. As shown, this covering is in the form of a seamless tube or sleeve that surrounds both the resilient body 7 and the cord 8 and is stitched or woven together as shown at 10 and 11 respectively adjacent to the cord 8 and body 7 to provide a narrow intermediate web 12.

For attaching the weather strip 4 to the jamb 1, I preferably provide a strip of molding 16 having a channel-shaped portion 17 for receiving the lateral flange 2 of the jamb, and an open return-bent portion 18 for receiving the bead 6 of the weather strip. As shown, the inner wall 19 of the channel-shaped portion 17 of the molding is provided at its forward edge with an open return-bent portion 20 that cooperates with the outer wall 21 to grip the flange 2 of the jamb. The outer wall 21 of the channel-shaped portion of the strip is also preferably provided at its forward edge with a return-bent portion 22, however this portion 22 is preferably bent closely adjacent to the wall 21 and terminates at the rear edge of the wall 21 in the open return-bent portion 18 which preferably extends laterally inwardly from the portion 22 so that it will be disposed immediately in rear of the channel base 23. Thus, it will be noted that the molding 16 is preferably formed of one strip of metal which may be bent into the desired form by any suitable means (not shown). In use, the weather strip 4 and molding 16 are preferably assembled by inserting the bead 6 into the open return-bent portion 18 which is then bent inwardly upon the bead to hold the same securely. The weather strip may then be attached quickly to the jamb 1 by merely sliding the cooperating portions 20 and 21 respectively of the channel-shaped portion of the molding transversely of the opposite sides of the lateral abutment flange 2 to the position shown in Figure 1 of the drawing. When applied to the jamb, the sealing member 5 is adapted to be compressed slightly by the door, hence it will be apparent that the weather strip will effectively prevent wind, water, dust, etc. from entering the vehicle body from between the door and jamb. Moreover, the sealing member 5 will also effectively cushion the door and will prevent the same from rattling when in closed position.

Thus, from the foregoing description, it will be readily apparent that I have provided a very simple and efficient weather strip which may be manufactured at a comparatively low cost. It will also be noted that the weather strip and molding may be easily and quickly assembled and that the latter may be readily attached to or detached from the door jamb 1. Furthermore, the construction of the molding is such that the outer portion 22 thereof will serve as a finish strip for the flange 2 of the jamb.

If desired, the weather strip 4 may be formed entirely of rubber as shown in Figure 5 of the drawing.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a closure member, and a frame member having a lateral abutment flange for the closure member, of a weather strip having a sealing member, and a longitudinally extending bead, and a strip of molding having a return-bent portion holding the bead, and cooperating portions gripping the lateral flange.

2. The combination with a closure member, and a frame member having a lateral abutment flange for the closure member, of a weather strip for sealing the joint between the closure member and frame member, and a strip of molding secured to the weather strip having cooperating portions gripping the lateral flange aforesaid.

3. A weather strip comprising a cover having spaced tubular portions with an intermediate substantially flat web, the cross sectional area of one of said tubular portions being larger than the cross sectional area of the other tubular portion, a tube of resilient material filling one of said tubular portions, and a cord filling the other of said tubular portions.

4. The combination with a closure member, and a frame member having a lateral abutment flange for the closure member, of a weather strip for sealing the joint between the closure member and frame member, and a strip of molding having a return-bent portion holding the weather strip and having another return bent portion overlapping and detachably secured to said lateral flange.

In testimony whereof I affix my signature.

WILLIAM MARSHALL.